United States Patent
Schultz et al.

[15] 3,677,607
[45] July 18, 1972

[54] HYDRAULIC POWER BRAKE SYSTEM

[72] Inventors: Harold B. Schultz; Keith H. Fulmer; Richard T. Burnett, all of 401 North Bendix Drive, South Bend, Ind. 46620

[22] Filed: April 5, 1971

[21] Appl. No.: 131,200

Related U.S. Application Data

[62] Division of Ser. No. 797,530, Feb. 7, 1969, Pat. No. 3,599,761.

[52] U.S. Cl. ................................. 303/10, 188/106 P, 303/6
[51] Int. Cl. ......................................................... B60t 13/14
[58] Field of Search .................. 188/170, 106 P; 303/6, 9, 2, 303/13, 10

[56] References Cited

UNITED STATES PATENTS

| | | |
|---|---|---|
| 3,033,325 | 5/1962 | Tjernstrom ........................... 188/170 |
| 3,090,359 | 5/1963 | Hoppenstand ..................... 188/170 X |
| 3,195,692 | 7/1965 | Herr et al. ............................... 188/170 |
| 3,385,636 | 5/1968 | Cruse .................................... 303/9 UX |
| 3,547,233 | 12/1970 | Girvan ................................ 188/106 P |
| 3,617,096 | 11/1971 | Grabb et al. ............................... 303/9 |

Primary Examiner—Milton Buchler
Assistant Examiner—John J. McLaughlin
Attorney—Ken C. Decker and Plante, Hartz, Smith & Thompson

[57] ABSTRACT

This invention relates to a hydraulic power brake means having two separate sources for hydraulic pressure controlled by a valve to provide separate pressures to a vehicle's front and rear brakes that also is able to regulate a mechanical brake applicator for at least one of the front or rear brakes.

14 Claims, 2 Drawing Figures

INVENTOR.
HAROLD B. SCHULTZ
KEITH H. FULMER
BY RICHARD T. BURNETT 3,677,607

HYDRAULIC POWER BRAKE SYSTEM

SUMMARY OF THE INVENTION

This application is a division of copending U.S. Pat. application Ser. No. 797,530, filed Feb. 7, 1969, now U.S. Pat. No. 3,599,761.

For the past several years it has appeared that there will be greater strides toward greater dependability of hydraulic systems made possible by the introduction of a hydraulic power brake system. It is visualized and a proven fact that more reserve and faster response in power braking is possible with such a system.

In order to set the stage for the following specific description of this invention, it should be noted that the term "-hydraulic power brake system" is used to identify the system as one in which the force of a driver's foot on the pedal does not cause fluid displacement. This force is used entirely to actuate the control valve and to direct fluid, stored under pressure in an accumulator, directly to the brake actuators. The amount of pressure metered through the valve is in direct proportion to the force applied to the pedal by the driver by means of reaction devices within the valve.

In view of current practice in accordance with Federal Laws, the system is actually a dual system with all major components installed in duplicate, except for the control valve which has two complete sets of valving elements in one housing. Each of the two circuits will function independently of the other. In normal operation, pressures in each circuit will be the same, within very close limits due to the construction of the valve and its actuation through an internal equalizing lever.

In each of the two systems, the fluid circuit is from a reservoir to a pump to the accumulator to the brake valve and thence to the reservoir upon release. The accumulator is a pressure storage vessel. In the accumulator is a rubber bladder which separates the 800 psi nitrogen gas discharge from the brake fluid. As the pump discharges fluid in the accumulator, the nitrogen is compressed and the pressure of the nitrogen and brake fluid rises to about 2,000 psi. Pressure is then maintained in the system at 1,800 – 2,000 psi. In order to provide separate drive means, one of the pumps is to be driven by an electric motor controlled by a pressure switch, as required, to maintain the system pressure; whereas the other pump is driven by a vehicle's engine and contains a regulator which cuts off inlet supply fluid when maximum system pressure is reached.

In the present invention there is shown a complete dual hydraulic power brake system which is divided to supply brake pressure for the front axle and separate brake pressure for the brakes of a rear axle. The rear axle includes provisions for mechanically actuating the brakes in response to a signal from the driver, or automatically in case of simultaneous failure of both power systems. Failure of only one system will not activate the mechanical brake actuator in the preferred form of the invention. The signal from the driver to set the brakes for emergency or parking is suggested as a switch to control a solenoid valve. However, as will be appreciated by those skilled in the art to which the invention relates, it could be a pair of hydraulic valves which are manually controlled.

As a result of the above, the principal object of the present invention is to offering segregated braking systems for a vehicle which are improved still further by simple means of providing parking brakes and emergency brakes in case of failure of both of the hydraulic power brake sections.

A further object of the invention is to provide in such a dual hydraulic brake system a means of delivery of each of the sections of the system to a brake containing a mechanical brake applicator so as to be biased against the force of the mechanical brake applicator and thereby render it ineffective under normal powered situations; and at the same time within the means of supply incorporate control mechanisms which will permit the utilization of the mechanical brake applicator for parking brakes for the vehicle.

DRAWING DESCRIPTION

As may be appreciated by those skilled in the art, while the invention is shown specifically related to a brake system for a vehicle, there are undoubtedly other applications in which one may need such a hydraulic control means as is suggested herein. In any event, Applicant has found a very worthwhile contribution by the invention to the braking art and has shown the invention with respect thereto as follows:

FIG. 1 is a schematic illustration of a hydraulic power brake system incorporating the features of this invention; and FIG. 2 is a cross sectional illustration of a brake applicator incorporating means for combining a hydraulic actuator with a mechanical brake applicator and having features to normally hold the mechanical brake applicator ineffective.

DETAILED DESCRIPTION

Figure 1:
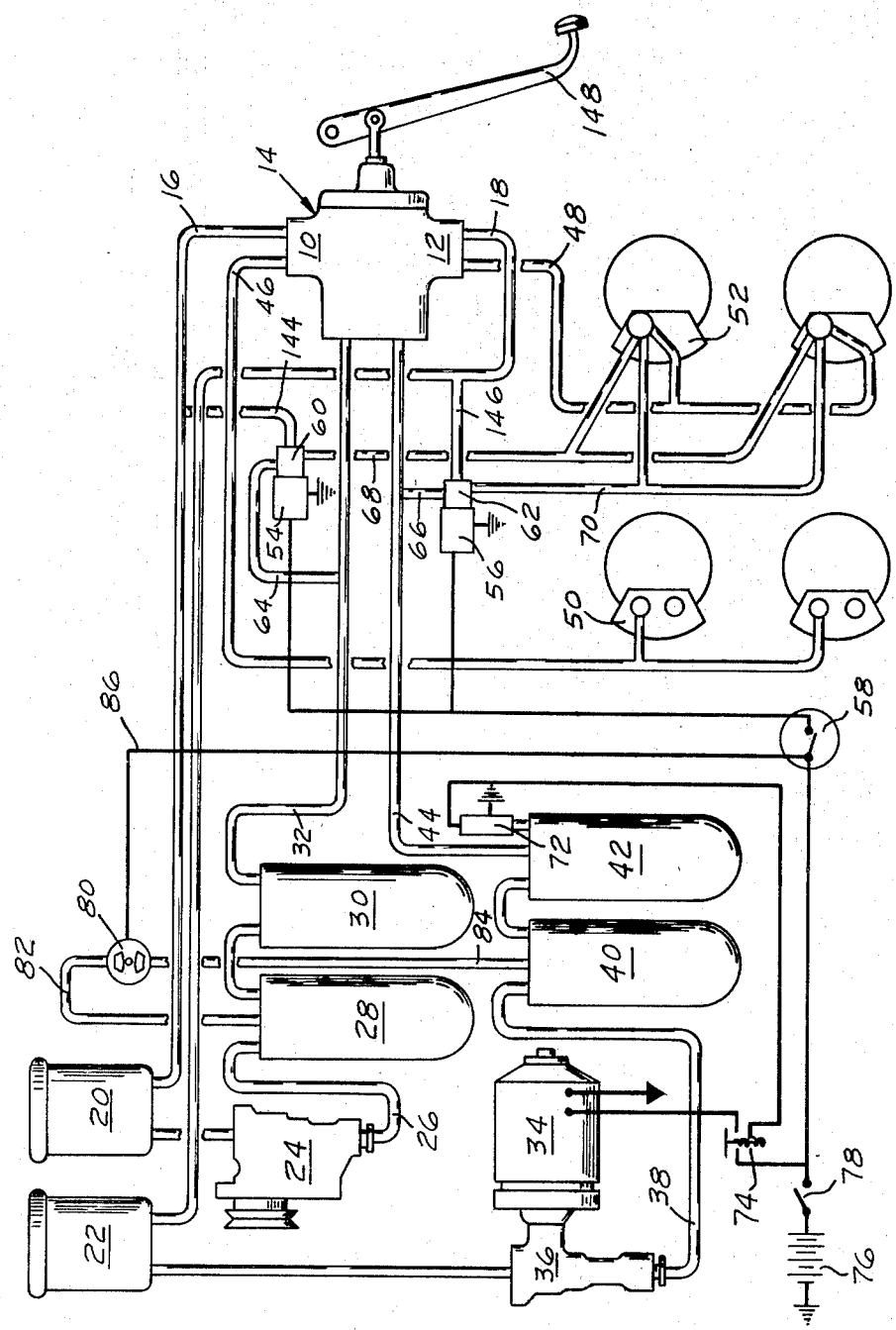

With reference now to FIG. 1 there is shown control valves 10 and 12 in a common housing 14 connected by means of separate conduits 16 and 18 to fluid supply reservoirs 20 and 22. An engine driven pump 24 is connected by a conduit 26 to an accumulator 28, which could be used alone if desired, but which is shown in series with another accumulator 30 in order to increase fluid reserve capacity. The accumulators are connected by means of a conduit 32 to the control valve 10 in the housing 14. An electric motor 34 drives another pump 36 to provide pressurized hydraulic fluid via conduit 38 to another accumulator means comprising accumulators 40 and 42 with a conduit 44 connecting this accumulator means to the control valve 12 within the housing 14. Conduits 46 and 48 connect control valves 10 and 12 to front disc brake means 50 and rear disc brake means 52, respectively.

Solenoids 54 and 56 controllable by means of a switch 58 are arranged to monitor hydraulic control valves 60 and 62, respectively, that are inserted in the aforementioned system so as to normally communicate hydraulic pressure received from conduits 64 and 66 to conduits 68 and 70 leading to the rear disc brake actuators 52.

As mentioned above, the pump 24 will have its own pressure regulating means internally thereof to maintain accumulators 28 and 30 at approximately 2,000 psi; whereas pump 36 is controlled by a pressure sensitive switch 72 which will regulate the operation of a relay 74 to connect motor 34 with a vehicle's storage battery 76 as long as an ignition switch 78 is closed to maintain approximately 2,000 psi in accumulators 40 and 42. A pressure gauge and warning means 80 is connected to each of the accumulators by means of conduits 82 and 84 and by means of an electrical lead 86 to the vehicle's battery 76 whenever ignition switch 78 is closed so as to provide the operator of the vehicle with a pressure indication and a warning light in the event of a pressure failure in one or both of the segregated systems.

Figure 2:
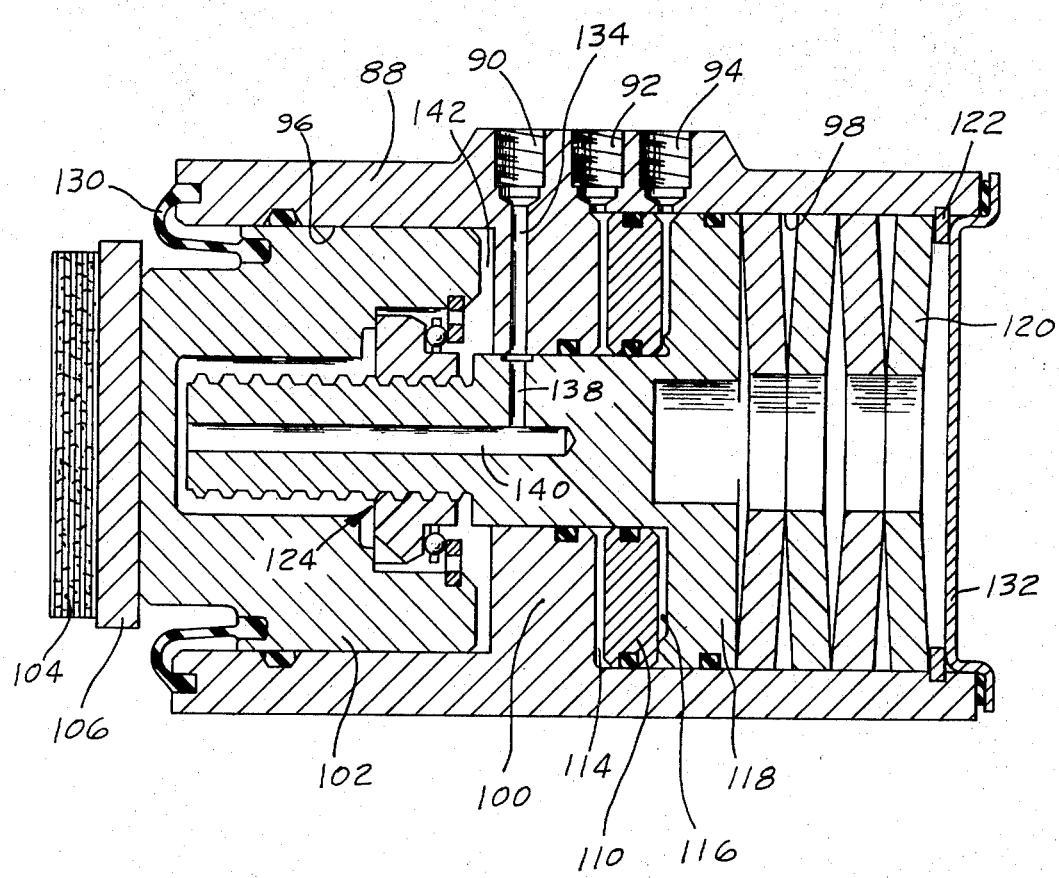

With reference now to FIG. 2, there is shown a caliper type disc brake actuator housing 88 having ports 90, 92 and 94 for connection with conduits 48, 68 and 70. Housing 88 is machined to provide a bore 96 at one end and another bore 98 at the other end separated by a partition 100. Within bore 96 a piston 102 is assembled for actuating disc brake pad 104 by being connected with its backing plate 106. Immediately to the right of the partition 100 within bore 98 a floating piston 110 is assembled so as to provide variable volume chambers 114 and 116 within the bore 98 and further defined by movable wall 118 positioned in bore 98 by Belleville washers 120 held within the bores by means of a snap ring 122 to provide a fixed reference point for an automatic adjuster mechanism 124. The bore 96 is then closed by means of a rubber boot 130, and bore 98 is closed by means of a press fitted cap 132.

It should be noted that in the attitude shown in FIG. 2 spring 120 has caused piston 102 to move the pad 104 into its braking attitude. When pressure is available at ports 92 and 94, wall 118 will be moved to its extreme right, normal, position where the effect of the Belleville washers 120 is then overcome by the aforesaid hydraulic pressures. The hydraulic pressure from conduit 48 that enters via port 90 passes through a passage 134 into a radial passage 138 to an axial passage 140 to permit communication of this hydraulic pressure to chamber 142 for actuating piston 102.

Floating piston 110 is preferably of equal effective area as annular portion of wall 118 therebehind such that pressure from either of the ports 92 or 94 will be effective to overcome the bias of the Belleville washers 120 on the wall 118, and thereby render the mechanical brake applicator (the Belleville washers) ineffective when pressure is available to either of these chambers.

Before passing on to the operation it should be noted that the hydraulic valves 60 and 62 (see FIG. 1) are communicable by means of conduits 144 and 146 to return lines 16 and 18 for the control valves 10 and 12.

OPERATION

In operation, braking is normally controlled by valves 10 and 12, the latter of which supplies fluid pressure to port 90 and via passages 134, 138 and 140 to chamber 142 for actuating piston 102. Assuming adequate brake pressure supply is available in accumulators 28, 30 and 40, 42 or in just one of these accumulator means, and so long as switches 58 and 78 are closed, pressure in chambers 114 and 116 will be effective to overcome the force of Belleville washers 120 and maintain the collapsed condition of same. In the event that switches 58 or 78 are opened, valves 60 and 62 will port chambers 114 and 116 to the return conduits 114 and 146 so as to remove the effect of hydraulic pressure in chambers 114 and 116. The spring means 120 (the Belleville washers) will then be effective to, via the automatic adjuster means 124, push the piston 102 to in turn move the disc brake pad 104 to its braking position. This is true even though there has been a pressure application via control valve 12, with the operator depressing brake pedal 148. Therefore, in the preferred form shown, the vehicle operator would normally maintain switch 58 in the closed condition, unless he wants parking brakes while the engine is running. Also, as is obvious in this preferred form, the spring 120 will apply the brakes whenever ignition switch 78 is opened.

In the event that both of the accumulator means 28, 30 and 40, 42 were to rupture or to otherwise loose pressure for conduits 32 and 44, respectively, this should also deplete the pressure in chambers 114 and 116 and permit the mechanical brake applicator in the form of Belleville washers 120 to actuate the disc brake pad 104 in the same manner as referenced above with respect to operation of switch 58.

In closing it should be noted that the mechanical brake applicator can be released by opening switch 58 to return the communication of conduits 64 and 66 with conduits 68 and 70 communicable to ports 92 and 94 to reset the mechanical brake applicator from within the cab of the vehicle. It is also envisioned that a separate hydraulic pressure source could be introduced to either port 92 or 94 by a simple valve assuming a double failure, that would permit the vehicle operator to move his vehicle readily in the event he has stopped in a precarious position as a result of the application of the brakes by spring 120.

We claim:

1. A hydraulic brake system having separate brake motors actuatable by separate pressures under the control of operator-operated valve means and characterized by the improvement to at least one of said separate brake motors comprising:
   a mechanical brake actuator;
   first and second piston means operatively interposed between said actuator and a respective motor having an area of one exposed to one of said separate pressures and an area of the other exposed to the other of said separate pressures to render said mechanical brake actuator normally ineffective; and
   another operator-operated valve means adapted to monitor said separate fluid pressures to said first and second piston means and to relieve fluid pressure thereon to activate said mechanical brake actuator.

2. A system according to claim 1 and further comprising an automatic adjuster means in the connection of said first and second piston means to the motor.

3. A system according to claim 1 wherein said respective brake motor and said first and second piston means are in a common housing with said brake motor and said first piston being interconnected by an automatic brake adjuster means and said second piston means being a floating piston.

4. A system according to claim 1 wherein said housing includes passage means porting control pressure to said brake motor and port means conducting separate pressures to said first and second piston means whose effective area is equal such that they can individually oppose said mechanical actuator.

5. The system of claim 1 wherein said mechanical actuator is characterized as a spring means between a housing, common to said brake motor and said piston means.

6. A hydraulic brake system comprising:
   a first pump means for a first hydraulic fluid source;
   a second pump means for a second hydraulic fluid source;
   a first accumulator means connected to said first pump means;
   a second accumulator means connected to said second pump means;
   a first control means having a first valve means between said first accumulator means and said first source and a second valve means between said second accumulator means and said second source, said control means having an operator-operated means for said first valve means and said second valve means;
   brake actuating means including a first brake hydraulic cylinder means and a second hydraulic cylinder means connected respectively to said first valve means and said second valve means to be controlled thereby, said brake actuating means further including a mechanical brake actuator operatively connected to braking elements of one of the said first and second cylinder means, said mechanical brake actuator having piston means subjected to said hydraulic pressure of both said first and second accumulator means; and
   a second control means having an operator-operated third valve means between said first accumulator means and said piston means and an operator-operated fourth valve means between said second accumulator means and said piston means normally communicating same, said third and fourth valve means being respectively communicable with said first and second hydraulic fluid source when actuated to activate said mechanical brake actuator.

7. The structure of claim 6 wherein said third valve means and said fourth valve means are spring biased electrically operated devices.

8. The structure of claim 6 wherein said third and fourth valve means are both solenoid valves controlled by a switch means.

9. The structure of claim 8 wherein the switch means is common to both solenoid valves.

10. The structure of claim 9 wherein said first and second pump means are powered by independent drive means.

11. The structure of claim 10 wherein one of said drive means is an electric motor controlled by a pressure responsive switch means operatively related to one of said accumulator means.

12. The structure of claim 11 and further comprising a gauge means having a first indicator operatively connected to said first accumulator means and a second indicator connected to said second accumulator means and a third indicator to provide a warning of a drop in pressure below a predetermined value of one and both said accumulator means which will also cause operation of said mechanical brake actuator by reducing if not in fact eliminating the bias thereagainst of said piston means.

13. The structure of claim 12 wherein said mechanical brake actuator is in the same housing for said respective hydraulic cylinder of said brake actuating means with said piston means therebetween.

14. The structure of claim 13 wherein said hydraulic cylinder includes a piston connected to a disc brake pad and by an automatic adjuster to said mechanical brake actuator all in the common housing with said piston means interposed.

* * * * *